(12) United States Patent
Finot et al.

(10) Patent No.: US 7,961,374 B2
(45) Date of Patent: Jun. 14, 2011

(54) THERMAL CONTROL OF OPTICAL FILTER WITH LOCAL SILICON FRAME

(75) Inventors: Marc Finot, Palo Alto, CA (US); Mark McDonald, Milpitas, CA (US); Andrew Daiber, Emerald Hills, CA (US)

(73) Assignee: Emcore Corporation, Albuquerque, NM (US)

( * ) Notice: Subject to any disclaimer, the term of this patent is extended or adjusted under 35 U.S.C. 154(b) by 0 days.

(21) Appl. No.: 12/825,066

(22) Filed: Jun. 28, 2010

(65) Prior Publication Data

US 2010/0265560 A1 Oct. 21, 2010

Related U.S. Application Data

(62) Division of application No. 11/731,223, filed on Mar. 30, 2007, now Pat. No. 7,771,071.

(51) Int. Cl.
*G02F 1/03* (2006.01)
*G02B 5/22* (2006.01)

(52) U.S. Cl. .................. 359/260; 359/900; 359/892
(58) Field of Classification Search .............. 359/260, 359/885, 892, 900; 156/101; 216/24
See application file for complete search history.

(56) References Cited

U.S. PATENT DOCUMENTS

| 7,616,847 B2 | 11/2009 | Daiber |
| 2007/0002911 A1 | 1/2007 | Sharma et al. |

*Primary Examiner* — Jack Dinh
(74) *Attorney, Agent, or Firm* — Blakely Sokoloff Taylor & Zafman LLP

(57) ABSTRACT

Briefly, in accordance with one or more embodiments, a thermally controlled optical filter comprises a frame coupled to an etalon where the frame includes a resistive thermal device disposed on the frame to obtain thermal measurements of the etalon during operation. The frame may be generally L-shaped or generally square-shaped. The frame may include a fillet that is generally planar, generally beveled or trapezoidal, or generally circular in shape. A heater may be additionally disposed on the frame. The etalon and frame subassembly may be bonded to a micro hot plate that is capable of heating the etalon to an operational temperature.

10 Claims, 4 Drawing Sheets

THERMAL CONTROL OF OPTICAL FILTER WITH LOCAL SILICON FRAME

CROSS-REFERENCE TO RELATED APPLICATIONS

The present application is a Divisional of U.S. patent application Ser. No. 11/731,223, filed on Mar. 30, 2007.

BACKGROUND

Thermally controlled optical filters may inadvertently provide thermal cross talk between the temperature of the filter and other sources of temperature variation, for example from the case in which the optical filter is disposed, from the substrate on which the optical filter is mounted, for from another filter disposed proximate to the filter. Furthermore, varying stresses may be imparted on the filter for example via coefficient of thermal expansion (CTE) mismatches and process variations, which may impact the stability of the filter and the reliability of the frequency at which the filter operates to select a desired wavelength of laser light.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
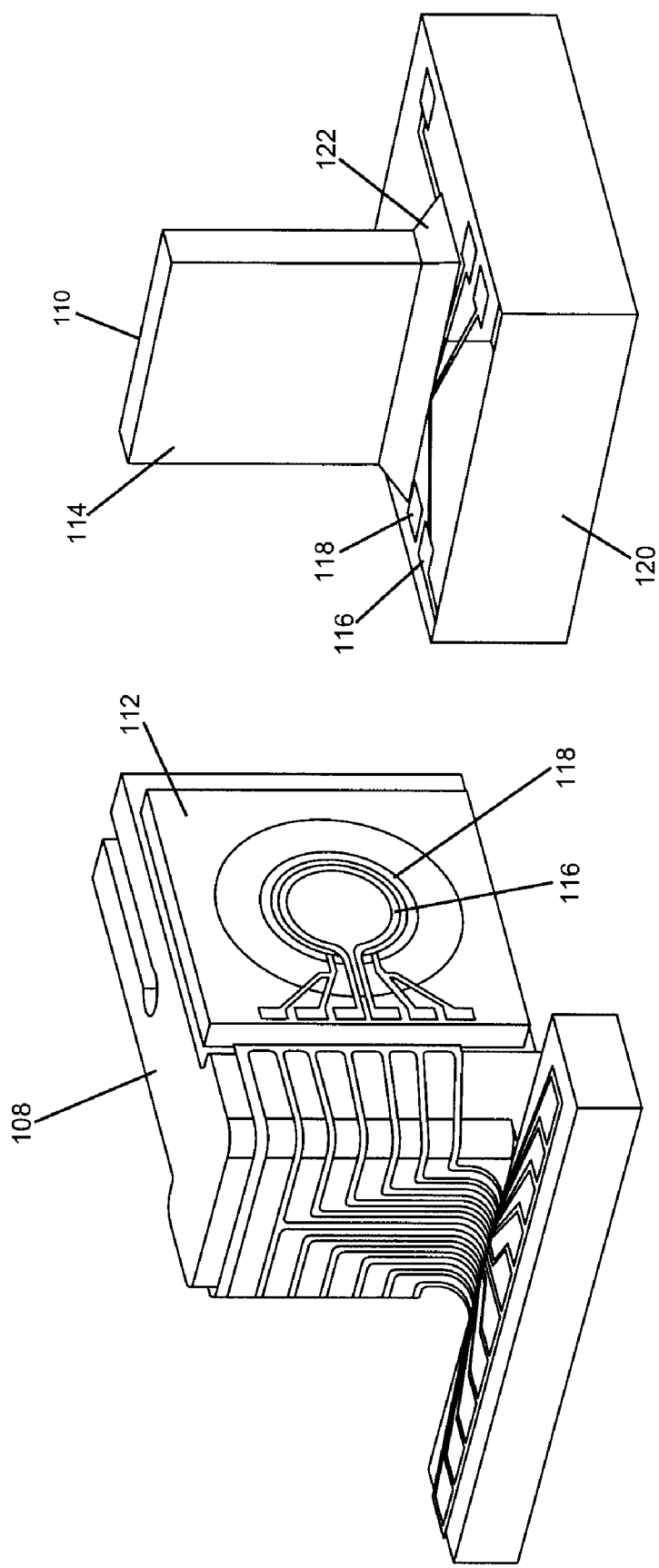
FIG. 1 is diagram of thermally controlled optical filters in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

Referring now to FIG. 1, a diagram of thermally controlled optical filters in accordance with one or more embodiments will be discussed. As shown in FIG. 1, a thermally controlled optical filter may generally comprise a hot plate type structure, for example a micromachined silicon filter 108 having an optical etalon 112 disposed thereon. Filter 110 may include a resistive temperature device (RTD) 118 and heater 116 that may be utilized to heat etalon 112 to an operational temperature and to take temperature measurements of the temperature of etalon 112 to select and control the temperature of etalon 112, for example in a feedback arrangement. Etalon 112 may comprise glass or a similar material and may be utilized to filter laser light from a laser (not shown) to tune the laser to a desired operational wavelength. In one or more embodiments, such a laser may comprise, for example, an external cavity laser. Such tuning of the wavelength of laser light passing through etalon 112 may be at least partially accomplished via controlling the temperature of etalon 112, however the scope of the claimed subject matter is not limited in this respect.

In one or more embodiments, optical filter 110 may comprise etalon 114 adhered to glass plate 122 which in turn may be adhered to resistive temperature device and heater 118. Etalon 114 may be adhered to glass plate 122 and/or glass plate 122 may be adhered to micro hot plate 120 having a resistive temperature device 118 and heater 116, for example using an epoxy or similar type of adhesive, although the scope of the claimed subject matter is not limited in this respect.

Optical filter 110 may provide thermal isolation as well as mechanical isolation of resistive temperature device 118 and heater 116. Such an arrangement may generally provide minimal cross-talk between the temperature of filter 110 and any external thermal load, for example case temperature and/or substrate temperature. Optical filter 110 may provide a simpler arrangement for controlling the temperature of etalon 114 resulting in a simpler assembly and manufacturing process. In such an arrangement, any increased cross talk between the temperature of optical filter 110 and the temperature of the case and other filters and/or the sled temperature may be addressed as described herein. Furthermore, any strain on resistive thermal device 118 and heater 116 induced by coefficient of thermal expansion (CTE) type effects and/or processing condition, for example due to relaxation of such strain over time, and any resulting error in temperature measurements, likewise may be addressed as described herein.

Figure 2:
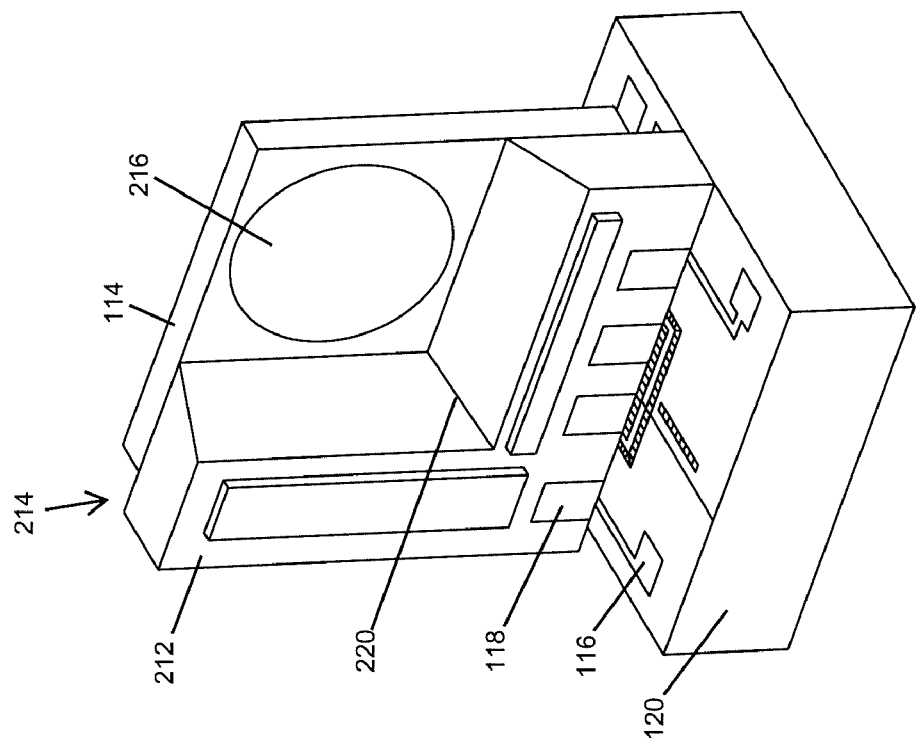
FIG. 2 is a diagram of thermally controlled optical filters including a resistive temperature device formed as a generally L-shaped frame in accordance with one or more embodiments.
Figure 2:
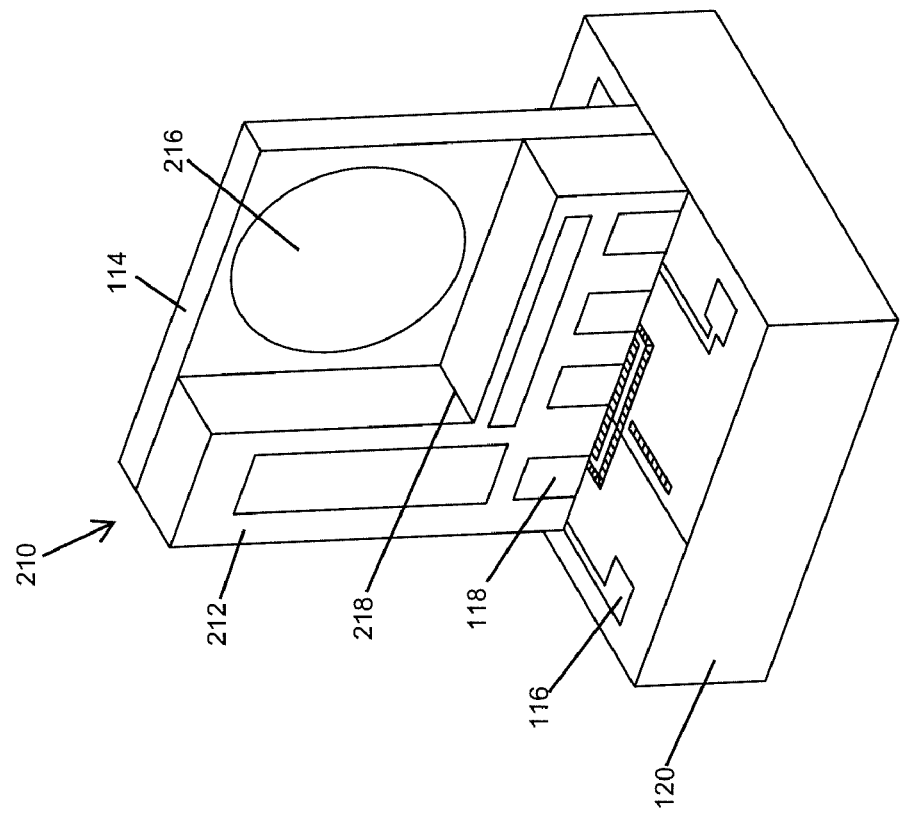

Referring now to FIG. 2, a diagram of optically controlled optical filters including a resistive temperature device formed as a generally L-shaped frame in accordance with one or more embodiments will be discussed. As shown in FIG. 2, optical filter 210 may be constructed to include resistive thermal device 118 comprising a generally L-shaped frame 212. Such an L-shaped frame may provide a more precise measurement of the temperature of etalon 114 and further may provide reduced cross talk and/or reduced processing stress on resistive thermal device 118 due to, for example, coefficient of thermal expansion (CTE) mismatch and process type effects.

In one or more embodiments, L-shaped frame 212 may comprise a highly thermally conductive material including but not limited to silicon (Si), tungsten copper (WCu), silicon carbide (SiC), and so on. L-shaped frame 212 may be disposed on micro hot plate 120 with heater 116 wherein an electrical connection between resistive thermal device 118 and micro hot plate 120 with heater 116 may be coupled, for example, using solder or wirebond. Such an L-shaped frame 212 for resistive thermal device 118 may be compatible with thin film processes to ad platinum/titanium (Pt/Ti) traces on resistive thermal device 118 in addition to one or more gold pads for solder or wirebond type connections. In one embodiment, L-shaped frame 212 may be arrived at via a dry etched process such as L-shaped frame 212 of optical filter 210, or alternatively L-shaped frame 212 of optical filter 214 may be arrived at, for example, via a wet etched process of silicon. In one or more embodiments, L-shaped frame 212 may comprise fillet 218 having one or more surfaces disposed at right or nearly right angles, and in one or more alternative embodiments, L-shaped frame 212 may comprise fillet 220 having one or more beveled or trapezoidal type surfaces, although the scope of the claimed subject matter is not limited in these respects. In one or more embodiments, etalon 114 may include an area 216 through which laser light may pass there through proximate to fillet 218 or fillet 220, although the scope of the claimed subject matter is not limited in these respects.

Figure 3:
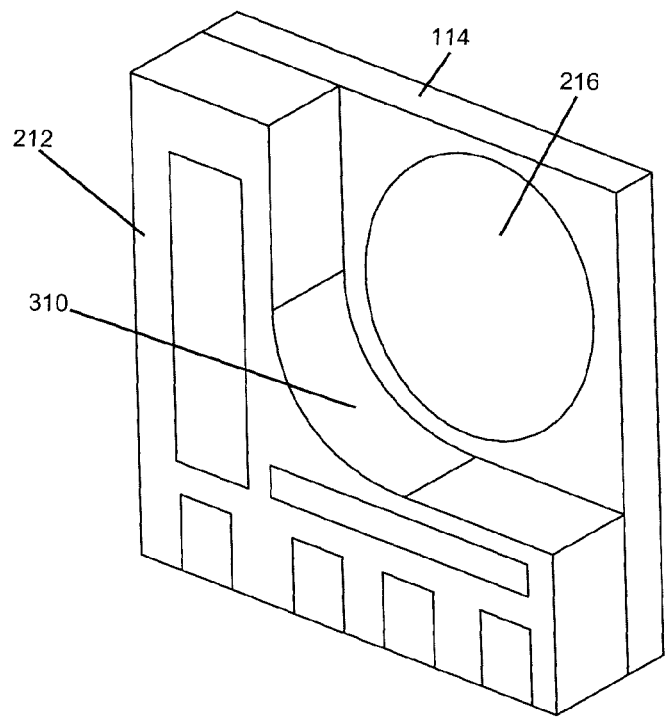
FIG. 3 is a diagram of a thermally controlled optical filter including a resistive temperature device formed as a generally L-shaped frame having a generally circular fillet in accordance with one or more embodiments.

Referring now to FIG. 3, a diagram of a thermally controlled optical filter including a resistive temperature device from as a generally L-shaped frame having a generally circular fillet in accordance with one or more embodiments will be discussed. As shown in FIG. 3, L-shaped frame 212 may comprise a generally circular fillet 310. In such an embodiment, circular fillet 310 may maximize, or nearly maximize, the contact area between L-shaped frame 212 and etalon 114 while reducing or eliminating clipping of the laser beam passing through area 216 of etalon 114, although the scope of the claimed subject matter is not limited in this respect.

Figure 4:
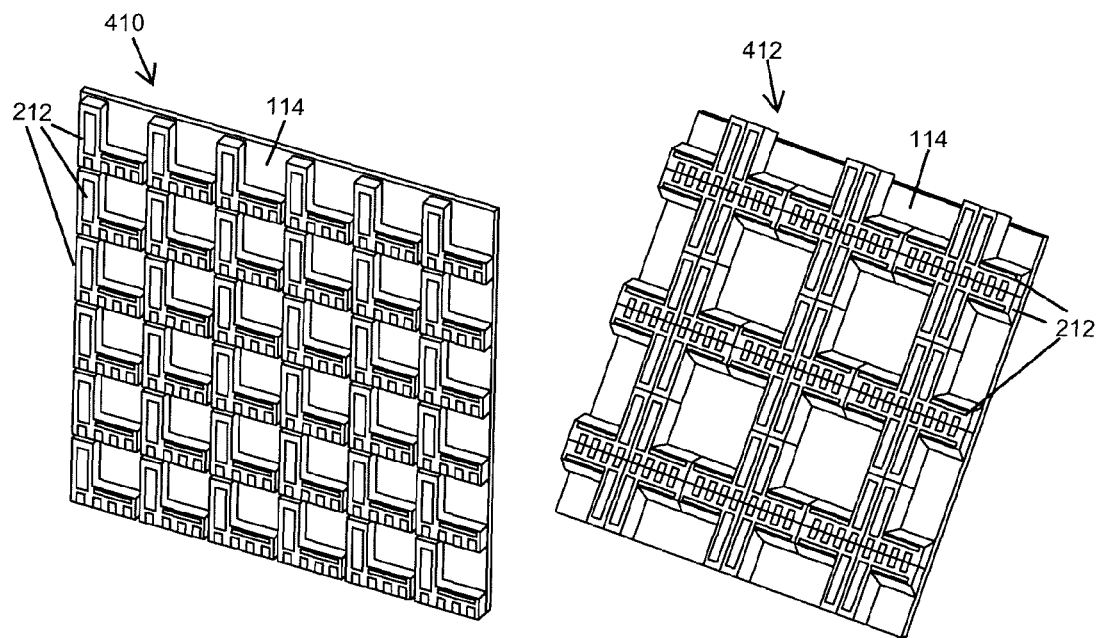
FIG. 4 is a diagram of resistive temperature devices formed in L-shaped frames bonded to an optical filter wafer in accordance with one or more embodiments.

Referring now to FIG. 4, a diagram of resistive temperature devices formed in L-shaped frames bonded to an optical filter wafer in accordance with one or more embodiments will be discussed. As shown in FIG. 4, L-shaped frames 212 may be processed using a standard type micromachined silicon technology or the like. In one or more embodiments, L-shaped frames 212 of resistive thermal devices 118 may be etched and then bonded to a wafer of etalons 114 prior to dicing and then subsequently diced to arrive at optical filter subassemblies. Further as shown in FIG. 4, in one embodiment L-shaped frames 212 may be formed via a dry etched wafer 410 or alternatively via a wet etched wafer 114, although the scope of the claimed subject matter is not limited in these respects.

Figure 5:
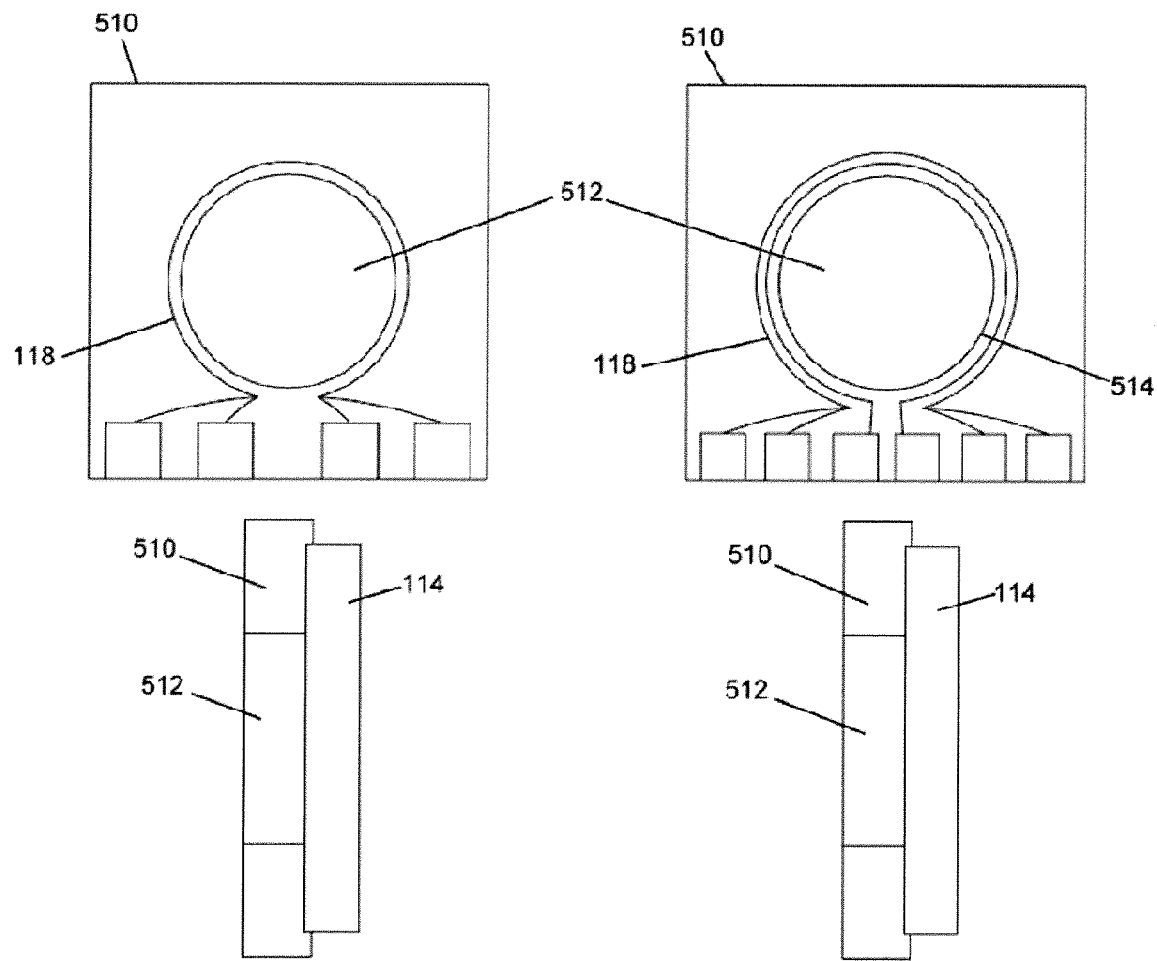
FIG. 5 is a diagram of a thermally controlled optical filter including a resistive temperature device formed in a generally square shaped frame in accordance with one or more embodiments.

Referring now to FIG. 5, a diagram of a thermally controlled optical filter including a resistive temperature device formed in a generally square shaped frame in accordance with one or more embodiments will be discussed. As shown in FIG. 5, a thermally controlled optical filter may be constructed with a square-shaped frame 510 rather than with an L-shaped frame 212. In such an arrangement, square-shaped frame 510 may include a circular opening 512 having resistive thermal device 118 disposed along a circumference of circular opening 512. In one or more embodiments, square-shaped frame 510 may include circular opening 512 having resistive thermal device 118 disposed along a circumference of circular opening 512 and may further include a heater 514 also disposed along a circumference of circular opening 512. It should be noted that L-shaped frame 212 and square-shaped frame 510 are merely example frames that may include resistive thermal device 118 and/or heater 116, wherein other shapes of frames likewise may be utilized, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to thermal control of optical filter with local silicon frame and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, ad/or further without providing substantial change thereto. It is the intention of the claims to encompass and/or include such changes.

What is claimed is:

1. A method, comprising:
   forming two or more frames from a first wafer;
   disposing a resistive thermal device on each of the two or more frames;
   bonding the first wafer to a second wafer to form a bonded combination wafer; and
   dicing the bonded combination wafer into two or more optical subassemblies of two or more optical filters.

2. The method of claim 1, wherein the first wafer comprises a thermally conductive material and the second wafer comprises a wafer of etalons.

3. The method of claim 2, wherein the thermally conductive material comprises silicon (Si), tungsten copper (WCu), or silicon carbide (SiC).

4. The method of claim 2, wherein said forming comprises a dry etch process or a wet etch process, or combinations thereof, to define the two or more frames on the first wafer.

5. The method of claim 1, further comprising bonding one of the optical filters onto a micro hot plate.

6. The method of claim 1, further comprising disposing a heater on each of the two or more frames.

7. The method of claim 1, wherein said forming comprises forming generally L-shaped frames.

8. The method of claim 7, wherein the generally L-shaped frames each include a fillet having at least one of right angled surfaces, planar surfaces, beveled surfaces, trapezoidal surfaces, or a circular surface.

9. The method of claim 1, wherein said forming comprises forming generally square shaped frames each having substantially circular openings.

10. The method of claim 9, wherein each of the resistive thermal devices is disposed along a circumference of the substantially circular opening of each of the generally square shaped frames.

* * * * *